US012739110B2

(12) United States Patent
Lin et al.

(10) Patent No.: US 12,739,110 B2
(45) Date of Patent: Sep. 15, 2026

(54) METHOD, ELECTRONIC DEVICE, AND COMPUTER PROGRAM PRODUCT FOR IDENTITY AUTHENTICATION

(71) Applicant: Dell Products L.P., Round Rock, TX (US)

(72) Inventors: Zhenzhen Lin, Shanghai (CN); Si Chen, Shanghai (CN)

(73) Assignee: Dell Products L.P., Round Rock, TX (US)

(*) Notice: Subject to any disclaimer, the term of this patent is extended or adjusted under 35 U.S.C. 154(b) by 242 days.

(21) Appl. No.: 18/524,058

(22) Filed: Nov. 30, 2023

(65) Prior Publication Data

US 2025/0141676 A1 May 1, 2025

(30) Foreign Application Priority Data

Oct. 27, 2023 (CN) ......................... 202311417716.7

(51) Int. Cl.
*H04L 9/08* (2006.01)
*H04L 9/30* (2006.01)

(52) U.S. Cl.
CPC ................ *H04L 9/088* (2013.01); *H04L 9/30* (2013.01)

(58) Field of Classification Search
CPC ......... H04L 9/088; H04L 9/30; H04L 9/3239; H04L 9/3247; H04L 9/50; H04L 63/0414; H04L 9/40; H04L 63/12
See application file for complete search history.

(56) References Cited

U.S. PATENT DOCUMENTS 10,673,632 B2 * 6/2020 Lu ......................... H04L 9/3239
10,685,099 B2 * 6/2020 Chen ..................... H04L 9/3239
(Continued)

FOREIGN PATENT DOCUMENTS

CN 116744297 A * 9/2023 ............ H04W 12/06
CN 116961947 A * 10/2023 ......... H04L 63/0823
(Continued)

OTHER PUBLICATIONS

Sandro Rodriguez Garzon, "Decentralized Identifiers and Self-Sovereign Identity in 6G", Published in: IEEE Network ( vol. 36, Issue: 4, Jul./Aug. 2022) , pp. 142-148 (Year: 2022).*
(Continued)

*Primary Examiner* — Shahriar Zarrineh
(74) *Attorney, Agent, or Firm* — Ryan, Mason & Lewis, LLP

(57) ABSTRACT

In embodiments of the present disclosure, a method for identity authentication is provided, which includes determining a confidence of an authentication node based on historical behavior, consensus, contribution, and security of the authentication node. The method further includes: receiving, by the authentication node, encrypted data of a user in response to the authentication node being a trusted node, where the authentication node is a node in a decentralized network and is connected with the Internet through a communication protocol to receive and authenticate encrypted data from the Internet, and the encrypted data includes personal information associated with user information and a signature issued by a publisher; decrypting the encrypted data; and determining an identity of the user based on authentication of the decrypted data. By using the method implemented in the present disclosure, the complexity of decentralized implementation is reduced, the user experience is improved, and users multiple sign-on options.

20 Claims, 7 Drawing Sheets

(56) References Cited

U.S. PATENT DOCUMENTS 10,972,475 B1 * 4/2021 Zaki ..................... G06F 21/604
2019/0097812 A1 * 3/2019 Toth ..................... H04L 9/0841
2019/0288854 A1 * 9/2019 Xie ..................... H04L 9/0891
2020/0153606 A1 * 5/2020 Li ..................... H04L 9/3239
2020/0153639 A1 * 5/2020 Yang ..................... G06F 16/2379
2020/0301894 A1 * 9/2020 Heo ..................... G06F 16/137
2020/0328878 A1 * 10/2020 Li ..................... G06F 16/2379
2021/0314293 A1 * 10/2021 Soundararajan ........ H04L 63/10
2021/0349882 A1 * 11/2021 Basak ..................... G06F 16/211
2021/0377254 A1 * 12/2021 Avetisov ............... H04L 67/133
2022/0360450 A1 * 11/2022 Brandenburger ..... H04L 9/0894
2023/0104103 A1 * 4/2023 Eby ..................... H04L 9/50 705/69
2023/0318811 A1 * 10/2023 Claesen ................ H04L 9/3247 380/30
2024/0372702 A1 * 11/2024 Shrivastava .......... H04L 9/0825
2025/0070963 A1 * 2/2025 Murdoch ................ G06F 21/73

FOREIGN PATENT DOCUMENTS

CN 117081758 A * 11/2023 ........... H04L 9/3247
CN 118677615 A * 9/2024 ............. H04L 9/088
EP 3788523 B1 * 3/2022 ............... H04L 9/50
KR 101929482 B1 * 3/2019 ......... G06F 16/2365
KR 102173426 B1 * 11/2020 ........... H04L 9/0643
KR 20230013591 A * 1/2023 ........... H04L 63/083
KR 20230108953 A * 7/2023 ......... H04L 63/0876
KR 20240028165 A * 3/2024 ......... H04L 63/0884
WO WO-2019209291 A1 * 10/2019 ........... H04L 9/3239

OTHER PUBLICATIONS

Md. Rayhan Ahmed, "Blockchain-Based Identity Management System and Self-Sovereign Identity Ecosystem: A Comprehensive Survey", Published in: IEEE Access (vol. 10), Date of Publication: Oct. 25, 2022, pp. 113436-113481 (Year: 2022).*

Wikipedia, "Self-sovereign Identity," https://en.wikipedia.org/wiki/Self-sovereign_identity, Jul. 20, 2023, 4 pages.

Okta, "Self-Sovereign Identity (SSI): Autonomous Identity Management," https://www.okta.com/identity-101/self-sovereign-identity/, Jul. 21, 2022, 9 pages.

E. Moyle, "How to Build an Effective IAM Architecture," https://www.techtarget.com/searchsecurity/feature/How-to-build-an-identity-and-access-management-architecture, Jun. 5, 2020, 9 pages.

* cited by examiner

METHOD, ELECTRONIC DEVICE, AND COMPUTER PROGRAM PRODUCT FOR IDENTITY AUTHENTICATION

RELATED APPLICATION

The present application claims priority to Chinese Patent Application No. 202311417716.7, filed Oct. 27, 2023, and entitled "Method, Electronic Device, and Computer Program Product for Identity Authentication," which is incorporated by reference herein in its entirety.

FIELD

Embodiments of the present disclosure generally relate to the field of data processing, and in particular, to a method, an electronic device, and a computer program product for identity authentication.

BACKGROUND

In computer networks, it is usually necessary to encrypt and protect sensitive information, because leaking of or unauthorized access to sensitive information may lead to a series of negative consequences, including but not limited to improper activities by using personal privacy data, leaking of intellectual property rights caused by unauthorized access, and network viruses.

Self-Sovereign Identity (SSI) provides a more secure way to save sensitive information, and also provides identity and ownership authentication functions. Users have their own personal information that does not need centralized management, and can demonstrate and prove the authenticity of selected attributes to a requester. This improves the security of user data and protects private information from being leaked to unauthorized parties.

SUMMARY

Embodiments of the present disclosure provide a method, an electronic device, a device, and a computer program product for identity authentication.

According to a first aspect of the present disclosure, a method for identity authentication is provided, which includes determining a confidence of an authentication node based on historical behavior, consensus, contribution, and security of the authentication node. The method further includes: receiving, by the authentication node, encrypted data of a user in response to the confidence indicating that the authentication node is a trusted node, where the authentication node is a node in a decentralized network and is connected with the Internet through a communication protocol to receive and authenticate encrypted data from the Internet, and the encrypted data includes personal information associated with user information and a signature issued by a publisher; decrypting the encrypted data; and determining an identity of the user based on authentication of the decrypted data.

According to a second aspect of the present disclosure, an electronic device for identity authentication is provided, which includes at least one processor and a memory coupled to the at least one processor and having instructions stored therein, wherein the instructions, when executed by the at least one processor, cause the electronic device to perform actions including determining a confidence of an authentication node based on historical behavior, consensus, contribution, and security of the authentication node. The actions further include: receiving, by the authentication node, encrypted data of a user in response to the authentication node being a trusted node, where the authentication node is a node in a decentralized network and is connected with the Internet through a communication protocol to receive and authenticate encrypted data from the Internet, and the encrypted data includes personal information associated with user information and a signature issued by a publisher; decrypting the encrypted data; and determining an identity of the user based on authentication of the decrypted data.

According to a third aspect of the present disclosure, a computer program product is provided. The computer program product is tangibly stored on a non-transitory computer-readable storage medium and includes machine-executable instructions which, when executed by a machine, cause the machine to perform steps of the method implemented in the first aspect of the present disclosure.

BRIEF DESCRIPTION OF THE DRAWINGS

By description of example embodiments of the present disclosure, provided in further detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1A:
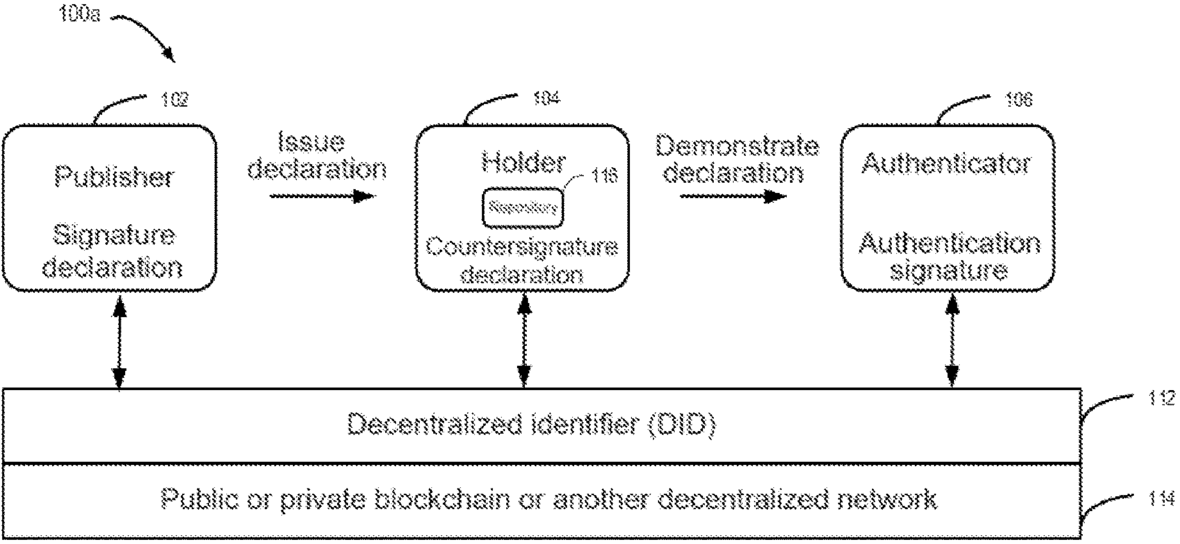
FIG. 1A shows a schematic diagram of a system based on SSI in which a device and/or a method of embodiments of the present disclosure can be implemented according to an embodiment of the present disclosure.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

SSI usually depends on protocols such as authenticable credentials, decentralized identifiers, and blockchains. SSI is a decentralized technology, which is different from an IAM solution, which is generally centralized. Therefore, when the industry tries to integrate SSI into the current IAM-related architecture, it will encounter problems, because the current main IAM architecture is still a centralized architecture in which user data is stored in local IT infrastructures or cloud providers, which is different from the mechanism based on decentralized SSI. In this hybrid identity environment where an SSI system and a centralized IAM system run in parallel to provide identity services, users face many inconveniences when browsing. For example, developers of a service provider should implement SSI support from scratch, which requires specialized knowledge in decentralization and security. Users need to sign on to different applications across sign-on mechanisms and switch back and forth between different sign-on methods, so there is a risk of confusing or losing these credentials or signing on with the wrong tools. All these hinder the adoption of such secure identity management methods.

To solve at least the above and other potential problems, embodiments of the present disclosure provide a method for identity authentication, which includes determining a confidence of an authentication node based on factors such as historical behavior, consensus, contribution, and security of the authentication node. The method further includes receiving, by the authentication node, encrypted data from a user in response to the confidence indicating that the authentication node is a trusted node. The authentication node is a node in a decentralized network. The authentication node is also connected with the Internet through a communication protocol to receive and authenticate encrypted data from the Internet. The encrypted data includes personal information associated with user information and a signature issued by a publisher. The authentication node decrypts the encrypted data and determines the identity of the user based on the authentication of the decrypted data.

By using the method implemented in the present disclosure, a hybrid IAM solution is implemented, which can implement the SSI solution while providing IAM functions and interfaces, reduce the complexity of decentralized implementation, improve the user experience of service providers, and provide users with multiple sign-on options.

Fundamental principles and several example embodiments of the present disclosure will be described in detail below with reference to the accompanying drawings. FIG. 1A shows a schematic diagram of a system 100*a* based on SSI in which a device and/or a method of embodiments of the present disclosure can be implemented according to an embodiment of the present disclosure. It should be understood that the number and arrangement of objects, components, and elements illustrated in FIG. 1A are examples only, and different numbers and different arrangements of components, elements, nodes, objects, and various additional elements may be included in the system 100*a*. It should also be understood that although the system 100*a* is an example in the present disclosure of an SSI-based system, the method implemented based on the present disclosure can also be applied to systems based on any architecture or system.

As shown in FIG. 1A, the SSI-based system 100*a* may include a publisher 102, a holder 104, and an authenticator 106, and these elements may be nodes in a decentralized network. According to embodiments of the present disclosure, the publisher 102 may be a device used by a trusted institution, the holder 104 may be a device used by a user, the authenticator 106 may be a device used by a service provider, and these devices are basic units that constitute the SSI-based system. These devices may be computers, hardware devices, servers, storage arrays, etc. They work together to provide data storage and access services. Each device usually has its own processing power, storage resources, network connectivity, and other functions. Additionally or alternatively, the SSI-based systems may have different devices and functions.

In some embodiments, the SSI-based system 100*a* may further include an authenticable credential, a decentralized identifier (DID) 112, a distributed ledger technology (DLT) or blockchain 114, and the like. The authenticable credential is a digitally encrypted and secure version of paper and digital credentials, which can be provided to organizations that need them for authentication. The DID 112 is a globally unique identifier consisting of a series of letters and numbers, which is independent of any organization. The DID 112 is published by relevant parties and can be securely connected to the authenticable credential. The blockchain 114 allows each participant in a secure network to have the same source of facts about the validity of credentials.

In some embodiments, the user can use a secure repository 116 on the device of the holder 104 to generate a public key and private key pair, store the private key in the holder 104, and publish the public key to the decentralized ledger or blockchain 114. The blockchain 114 can generate the DID 112 for the user of the public key and store it in its data repository. Then, the user requests the publisher (trusted institution) 102 to provide an authenticated digital identity declaration (authenticable credential) or a signature declaration, and stores it in the secure repository 116 on the device of the holder 104 as a countersignature declaration.

When the authenticator (service provider) 106 needs user information, the user can provide the entire declaration or only a subset of the declaration of the authenticated credential from the secure repository 116 on the holder 104. The authenticator 106 can verify the authenticity of the identity by authenticating the public key signatures of the holder DID and the publisher DID on the decentralized ledger or the network 114. Thus, the SSI-based system 100*a* provides a more secure method to protect sensitive information. In SSI, users have their own data and do not rely on institutions to prove their identities. Unlike other forms of digital identity, it is not necessary in SSI to share all the information on the ID every time. Sharing relevant information only with ID requesters is helpful for ensuring privacy and security.

The SSI-based system 100*a* can help various industries to enhance user experience and protect user data. For example, in the banking industry, the SSI-based system 100*a* can help protect user data and maintain privacy. In the human resources department, the SSI-based system 100*a* can speed up the entry of new employees and help individuals authenticate necessary information. The SSI-based system 100*a* can also provide public services, allowing users to control their own identities without relying on centralized institutions. The SSI-based system 100*a* may also include decentralized node deployment and connection and Application Programming Interface (API) support that is easy to configure and use.

As an example, the SSI-based system 100*a* may be installed in any computing device having processing computing resources or storage resources. For example, the computing device may have common capabilities such as receiving and sending data requests, real-time data analysis, local data storage, and real-time network connection. The computing device may typically include various types of devices. Examples of the computing device may include, but are not limited to, database servers, rack servers, server clusters, blade servers, enterprise servers, application servers, desktop computers, notebook computers, smartphones, wearable devices, security devices, intelligent manufacturing devices, smart home devices, Internet of Things devices, smart cars, drones, and the like, and the present disclosure does not make any limitation in this regard.

Figure 1B:
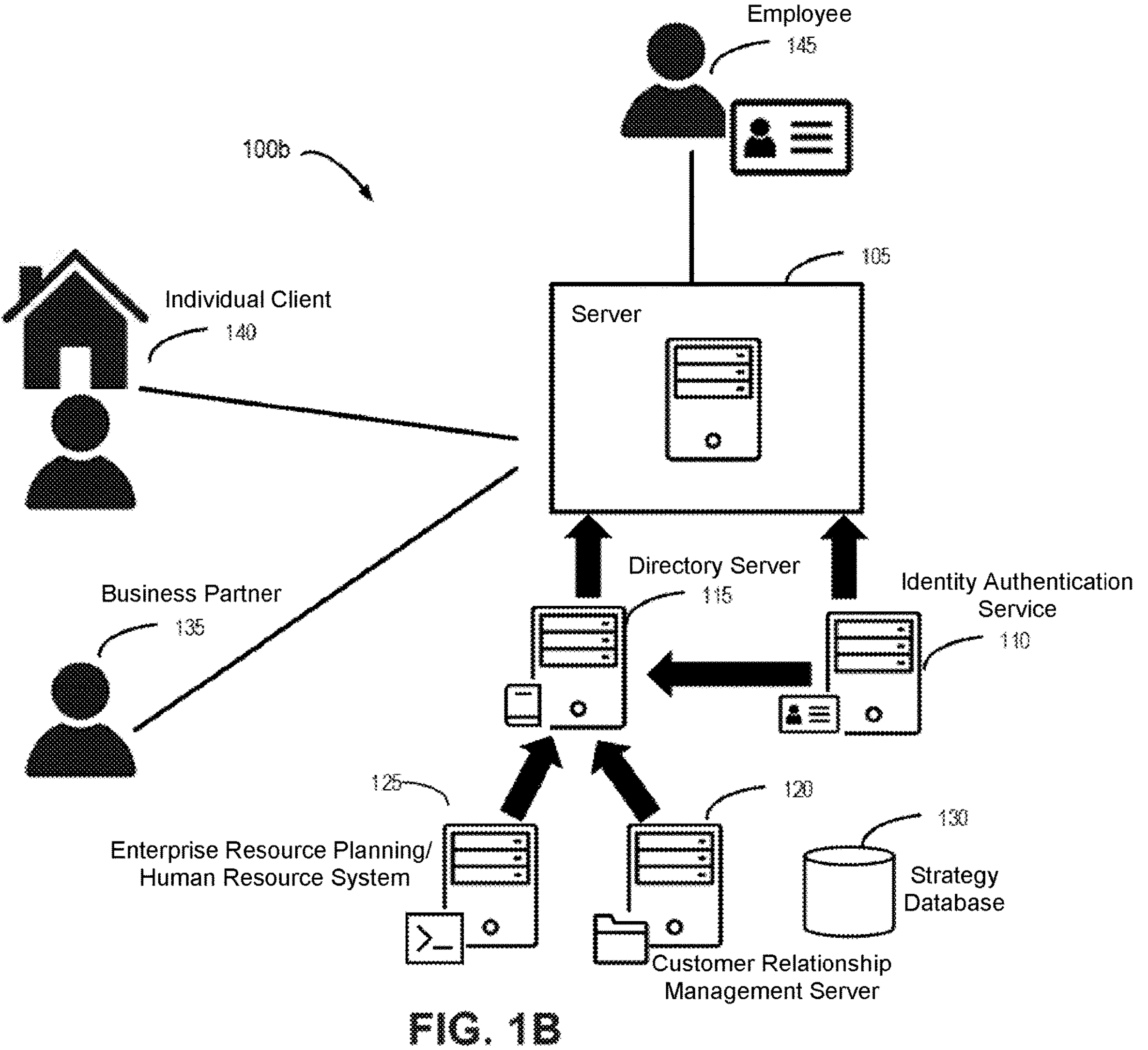
FIG. 1B shows a schematic diagram of a system based on centralized identity management in which a device and/or a method of embodiments of the present disclosure can be implemented according to an embodiment of the present disclosure.

FIG. 1B shows a schematic diagram of a system 100*b* based on centralized identity management in which a device and/or a method of embodiments of the present disclosure can be implemented according to an embodiment of the present disclosure. It should be understood that the number and arrangement of data, objects, components, and elements illustrated in FIG. 1B are examples only, and different numbers and different arrangements of components, elements, processing nodes, objects, and various additional elements may be included in the system 100*b*. It should also be understood that although the system 100*b* is an example in the present disclosure of an IAM-based system, the method implemented based on the present disclosure can also be applied to systems based on any architecture or system.

As shown in FIG. 1B, the IAM-based system 100*b* may include elements or components such as a server 105, a directory server 115, an identity authentication service 110, an Enterprise Resource Planning (ERP) or human resource (HR) system 125, a Customer Relationship Management (CRM) server 120, and a strategy database 130. According to embodiments of the present disclosure, the IAM-based system 100*b* may be centralized in a local IT infrastructure or a cloud provider.

The directory server 115 may store information identities associated with user accounts. It is dedicated to storing and managing structured data, and may include user information, organizational structure, resource information, and the like. The directory server 115 may run based on the Lightweight Directory Access Protocol (LDAP) for organizing and retrieving data stored in the directory. The identity authentication service 110 can provide user identity authentication for users. In some embodiments, implementations of the identity authentication service 110 may include Multi-Factor Authentication (MFA), Single Sign-On (SSO), token identity authentication, biometric identity authentication, and the like. Different applications can use different identity authentication methods, and the specific choice depends on security requirements, user experience, and specific requirements of the applications.

In some embodiments, the strategy database 130 may be used to determine access control and authorization. For example, the strategy database 130 may store rules and rights for defining which users, groups, or entities can access a specific resource and what operations to perform on the resource. In some embodiments, the identity and role assignment information from the ERP or HR system 125 can be configured to the directory server 115 through an internal configuration process based on predetermined strategies and rules.

In some embodiments, the server 105 may enforce assigned rights according to applicable strategies to control access to the system. In some embodiments, the server 105 identifies important events that need to be checked, which are significant and related to the security of the information system. The organization specifies which information system components perform check activities. The check activities may affect the performance of the information system. Therefore, according to the risk assessment, the organization decides which events need to be continuously checked and which events need to be checked in response to specific situations.

In some embodiments, the server 105 may also provide various services and resource assignment for other services or components. Storage capacity, data resources, and the like are assigned to control which users or entities can access these resources and what operations they can perform. An administrator can assign rights and strategies through the server 105 to ensure that only authorized users or services can access resources and operate in the required way. These resources may be data stored in a cloud, virtual machines, the strategy database 130, storage buckets, etc.

In some embodiments, the ERP or HR system 125 can coordinate and integrate various business processes and functions of various departments within an organization. The ERP or HR system 125 increases the efficiency, benefits, and decision support of the organization by providing a unified information and workflow management platform. The ERP or HR system 125 may include multiple modules, such as finance, human resources, supply chain management, production planning, procurement, sales, inventory management, etc. These modules may be integrated in a unified database, so that all departments can share data and information, thereby reducing repeated data entry and improving data accuracy.

In some embodiments, the CRM server 120 can be used to help organizations establish, maintain, and improve relationships with customers. For example, the CRM server 120 can centralize the storage of customer information, including contact information, purchase history, communication records, etc., so as to realize customer data management and provide more personalized services. The CRM server 120 can also provide data analysis tools to help organizations understand customer behaviors, trends, and needs, so as to better make strategies and decisions.

In some embodiments, a role such as a business partner 135 can contribute through an alliance agreement or through a contract, so that its ID information is kept up to date in the server 105 and the directory server 115. In some embodiments, a role such as an individual client 140 accepts a protocol that defines the purpose and boundary of data usage, thereby realizing access to the server 105 and the directory server 115. In some embodiments, the information about a role such as an employee 145 of an enterprise can be entered into the server 105 and the directory server 115 to realize the management and control of employees by the enterprise.

Figure 2:
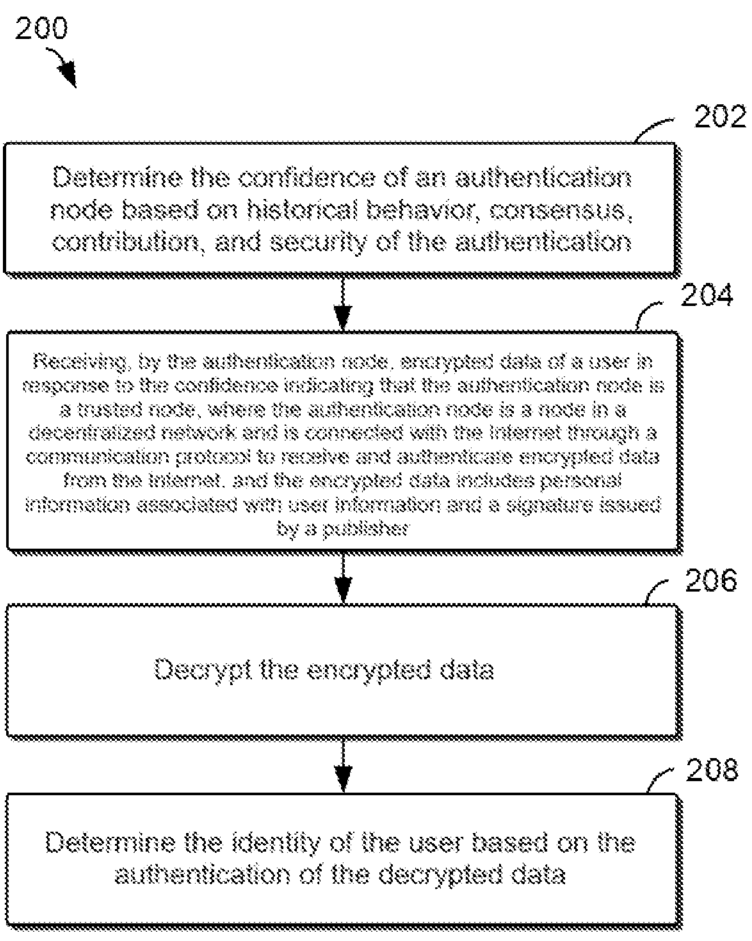
FIG. 2 shows a flow chart of a method for identity authentication according to an embodiment of the present disclosure.

Schematic diagrams of environments in which some embodiments of the present disclosure can be implemented have been described above in conjunction with FIGS. 1A and 1B. A flow chart of a method 200 for identity authentication according to an embodiment of the present disclosure will be described below in conjunction with FIG. 2. The method 200 may be performed at the SSI-based system 100*a* and the IAM-based system 100*b* in FIGS. 1A and 1B, a hybrid system based on both SSI and IAM, and at any suitable computing device. The hybrid system based on SSI and IAM will be described in detail below with reference to FIGS. 3A and 3B.

At block 202, the confidence of an authentication node is determined based on historical behavior, consensus, contribution, and security of the authentication node. As an example, the hybrid system based on SSI and IAM or the user can determine, before transmitting encrypted data associated with the user, the confidence of the authentication node to which the data is to be transmitted. In some embodiments, the authentication node may be the authenticator 106 shown in FIG. 1A, and has processing power, storage resources, network connectivity, and other functions. The authentication node may also be connected or integrated with the server 105 and/or the directory server 115 in FIG. 1B, and accordingly has the ability to access the information associated with the user.

In some embodiments, the method for determining the confidence of the authentication node may include determining whether the authentication node has identity authentication and authorization, for example, by determining whether the authentication node has a valid digital certificate, SSL/TLS certificate, or other forms of identity authentication mechanism, and only when the authentication node has a valid digital certificate can it be determined that the authentication node is a trusted node.

In some embodiments, a method for determining the confidence of the authentication node may include determining whether the authentication node is a trusted node through a consensus algorithm based on a plurality of nodes in a decentralized network, such as Proof of Workload (PoW), Proof of Stake (POS), or Byzantine Fault Tolerance (BFT). When more nodes consider the authentication node to be a secure node, the authentication node can be considered as a trusted node. In some embodiments, the confidence of the authentication node may also be determined based on the reputation of the authentication node. For example, the reputation and history of the node can be learned. Whether the node has performed its duties honestly in the past, or whether there is a record of misconduct, and what the community or other users think of the node.

In some embodiments, the confidence of the authentication node may also be determined based on the contribution level of the authentication node. For example, the contribution to computing power, storage, bandwidth, and other resources by the node, whether the node actively supports the operation of the network, and other factors can be considered. In some embodiments, the historical data of the node can also be considered, including its performance, availability, and security records, whether there are past attack events or failures, how the running time and availability of the node are, the evaluation of the node by the community, and other factors.

In some embodiments, the confidence of the authentication node may also be determined based on the security measures of the authentication node, such as whether the node has taken security measures such as firewall, encrypted communication, and vulnerability management, whether these security measures are strong enough, and other factors. In some embodiments, the confidence of the authentication node may also be determined based on feedback from other users and whether other users have reported problems related to the node, and by regularly checking and monitoring the authentication node.

Through the method described above at block 202, the hybrid system based on SSI and IAM can determine whether the authentication node to which data is to be transmitted is a trusted node or an untrusted node. At block 204, the authentication node receives encrypted data of a user in response to the authentication node being a trusted node, where the authentication node is a node in a decentralized network and is connected with the Internet through a communication protocol to receive and authenticate encrypted data from the Internet, and the encrypted data includes personal information associated with user information and a signature issued by a publisher.

When it is determined that the authentication node is a trusted node, the hybrid system based on SSI and IAM can allow the user to send encrypted data to the authentication node, where the data may be data associated with user identity, personal profile, and other information. For example, the content of the encrypted data may be credentials or data issued to the user by a corresponding institution such as the publisher 102, such as ID card, passport, driver's license, graduation certificate, and company employee information.

In the context of a decentralized network, data associated with the user may be hashed first and then encrypted by, for example, a private key held by the publisher 102 to generate encrypted data. In some embodiments, the publisher 102 may also add a digital signature to the data it publishes, and the encrypted data may also be called a declaration. The authentication node can communicate with an external network such as the Internet based on a communication protocol.

Additionally or alternatively, in some embodiments, the external network may be an Internet-based centralized network, such as a social media platform, an email service provider, a video sharing platform, a banking network, a telecommunications and Internet service provider, a cloud computing service network, a public institution network, and the like. In some embodiments, these communication protocols may include the Open Authorization 2.0 protocol, the OpenID Connect protocol, the Security Assertion Markup Language (SAML) 2.0, and the like.

At block 206, the encrypted data is decrypted. As an example, the authentication node can decrypt the encrypted data using a public key which is stored in a decentralized identifier (DID) document in a decentralized network. In some embodiments, the decentralized identifier can be used to identify a digital identifier of an entity to provide decentralized, verifiable, and controllable identity authentication. The decentralized identifier document may include a DID URL, which is used to point to a resource related to the DID, such as a public key.

In some embodiments, data from the user can first be encrypted by using private keys provided by publishers, for example, based on the Rivest-Shamir-Adleman (RSA) algorithm, the Advanced Encryption Standard (AES) algorithm, and a hash function, and corresponding public keys and decentralized identifiers associated with the public keys can be generated based on these private keys. The generated public keys and decentralized identifiers can be stored in a decentralized identifier document for decryption and certification by the authentication node.

The decentralized identifier document may include one or more public key entries that associate the public keys with particular DIDs. Each public key entry may include the value of the public key used for digital signature and authentication, the type of the public key (encryption algorithm or signature algorithm used, for example, specifying that the public key is an RSA public key or an elliptic curve digital signature public key), a controller (for example, a DID owner who can use the public key for signature and authentication), and the purpose (specifying the purpose of the public key, for example, signature, encryption, etc.).

At a block 208, the identity of the user is determined based on the authentication of the decrypted data. In some embodiments, the authentication node can verify whether the data has been tampered with through the consistency between the signature contained in the decrypted data and the publisher signature in the publishing node. If the signatures are inconsistent, it means that the data has been tampered with. In some embodiments, the authentication node may compare the actual hash value in the decrypted data with the expected hash value calculated based on the content of the declaration.

If the actual hash value matches the expected hash value, it means that the data integrity has been verified since the data has not been tampered with during transmission. If the actual hash value does not match the expected hash value, it may indicate that the data has been tampered with, or there is a data transmission or decryption error. In this case, the data can no longer be trusted.

In some embodiments, the authentication node may also have a strategy control module, which can define which nodes or users can access, view, or modify specific data to ensure the privacy of the data, thus controlling the access rights of users. For example, when the user has rights of an administrator, the authentication node can allow the user to add data to the decentralized network, delete data from the decentralized network, and modify data in the decentralized network. However, when the user has rights of a normal user, the authentication node can allow the user to browse only the user data associated with the user in the decentralized network, such as the user profile.

In some embodiments, the authentication node can also issue an identity signature or declaration to the user, and the identity signature can be used for authentication with another authentication node. For example, when the authentication node is a school, it can issue an identity signature or declaration associated with a degree certificate to students. When a student submits his or her resume, he or she can show the identity signature or declaration to another authentication node, such as a company or a public institution, for verifying the authenticity and validity of the degree certificate.

Additionally or alternatively, in some embodiments, when the identity signature becomes invalid, the authentication node can revoke or modify the identity signature. For example, when the school as an authentication node finds that a student does not meet the graduation-related requirements during the actual study period, it can revoke or modify the identity signature or declaration associated with the degree certificate that has been issued to the student.

In some embodiments, the authentication node may communicate with an identity federator to authenticate a user. The identity federator can transfer identity authentication and authorization information from one identity provider to another, thus realizing identity federation and single sign-on function. The identity federator establishes trust between multiple independent identity authentication domains, enabling users to seamlessly access resources and services between these domains without signing on or inputting credentials many times. For example, the identity federator can allow the user to access multiple associated applications and services with one sign-on, without entering a different credential for each application. In some embodiments, the identity federator can connect different identity providers, such as the directory server 115, social media sign-on, or other identity authentication systems of an enterprise to establish federated identity authentication. By communicating with the identity federator, the authentication node can provide authentication services for applications from different systems on multiple platforms.

The flow chart of the method 200 for identity authentication according to an embodiment of the present disclosure has been described above in conjunction with FIG. 2. A schematic diagram of a hybrid system 300*a* based on SSI and IAM according to an embodiment of the present disclosure will be described below in conjunction with FIG. 3A.

Figure 3A:
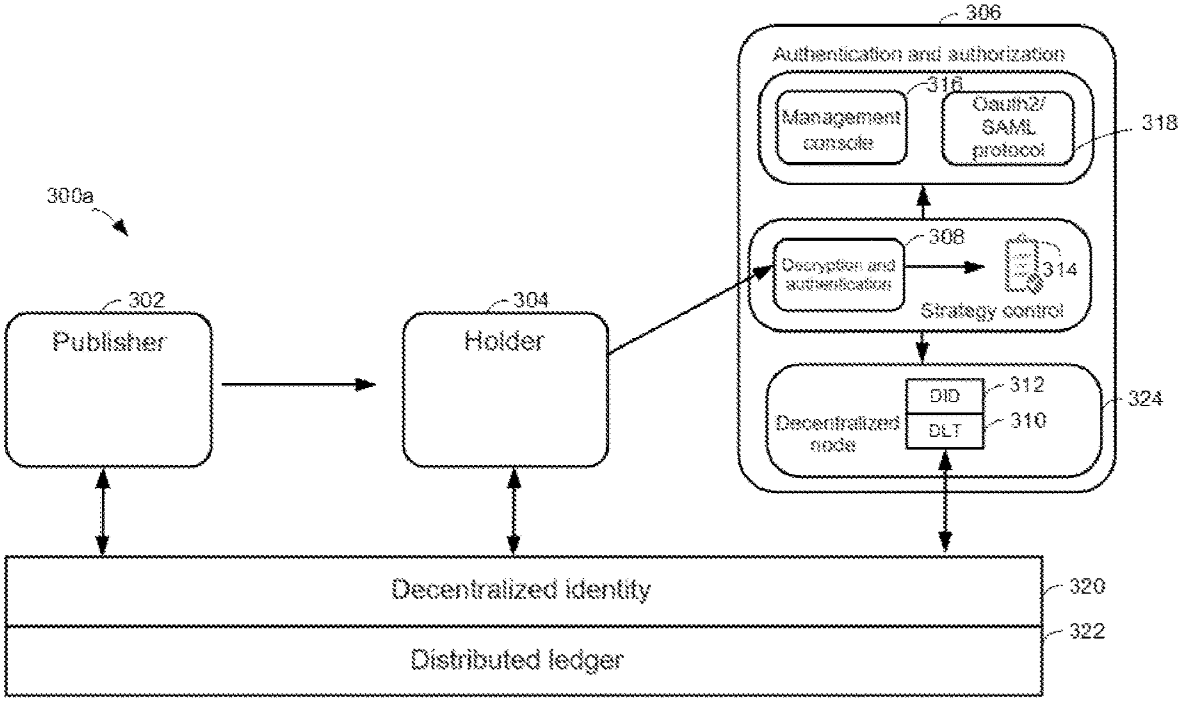
FIG. 3A illustrates a schematic diagram of a hybrid system based on SSI and identity and access management (IAM) according to an embodiment of the present disclosure.

As shown in FIG. 3A, in some embodiments, a publisher 302 such as a school, a company, or a notary office can issue various credentials such as a degree certificate, a driver's license, an employee card, etc., to a holder 304 such as a student or an enterprise employee. These credentials may be included in various declarations and include the corresponding digital signature of the publisher 302. The digital signature can be made by hashing the content of the credential and encrypting it with the private key of the publisher 302.

The data associated with the credential may then be saved at the holder 304. When the holder 304 needs to be authenticated with an authentication node 306, it can send encrypted data including the credential and the digital signature to the authentication node. In some embodiments, the holder 304 can check whether the authentication node 306 is a trusted node before transmitting the encrypted data to the authentication node 306. For example, the authentication node 306 can be confirmed as a trusted node by checking historical behavior, consensus, contribution, and security factors of the authentication node 306.

The authentication node 306 may be a built-in decentralized node in a global decentralized network, and the decentralized network can support decentralized identities. The authentication node 306 can accept encrypted data or declarations from the holder 304. In some embodiments, the authentication node 306 may have a decryption and authentication module 308, which can decrypt and authenticate the encrypted data and act as an SSI-based authenticator. For example, the decryption and authentication module 308 can decrypt the encrypted data or declarations of the holder 304 using the public key obtained from a DID document 312 stored in a distributed ledger 310 or a blockchain network.

In some embodiments, the decryption and authentication module 308 can compare the hash value decrypted by the public key with the hash value calculated based on the content of the declaration to determine whether the encrypted data has been tampered with. In this way, the attack and leakage in centralized authorization can be prevented, while its tamper resistance and credibility can be maintained.

In some embodiments, after the authentication is successful, the authentication node 306 can extract user attributes in the encrypted data, such as the user's right level, as an input to a strategy control module 314 which is an authorization part in the IAM. The strategy control module 314 can be used to define which users, roles, or entities can access resources or data in the hybrid system 300*a*, and determine their right levels. For example, when an enterprise employee tries to access a human resource file that can only be accessed by an employee of the human resources department, the strategy control module 314 will not allow the enterprise employee to access the corresponding file because the enterprise employee does not have the corresponding right level.

In some embodiments, the hybrid system 300*a* also supports communication with users using protocols. For example, the hybrid system 300*a* can provide a service provider with protocols 318 such as OAuth2, OpenID, SAML, etc. to provide authentication and authorization functions, and the service provider does not need to care about the details of the hybrid system 300*a*. The previous integration with IAM can be maintained in these protocols 318 without the need to develop additional logic.

In some embodiments, for an IT administrator, the hybrid system 300*a* may provide a management console 316 to add, delete, and modify user information. For example, the management console 316 may include a user interface or tools for managing and monitoring applications, networks, or services in the management console 316. It is usually used by the administrator or an operator to configure, monitor, troubleshoot, and manage various aspects of the hybrid system 300*a*.

Additionally or alternatively, in some embodiments, the authentication node 306 may also include or be part of a decentralized node 324. In some embodiments, the publisher 302, the holder 304, and the authentication node 306 may be connected with a distributed ledger or a blockchain network 322, and become part of the distributed ledger or blockchain network 322, via a decentralized identity or a decentralized identifier 320.

Figure 3B:
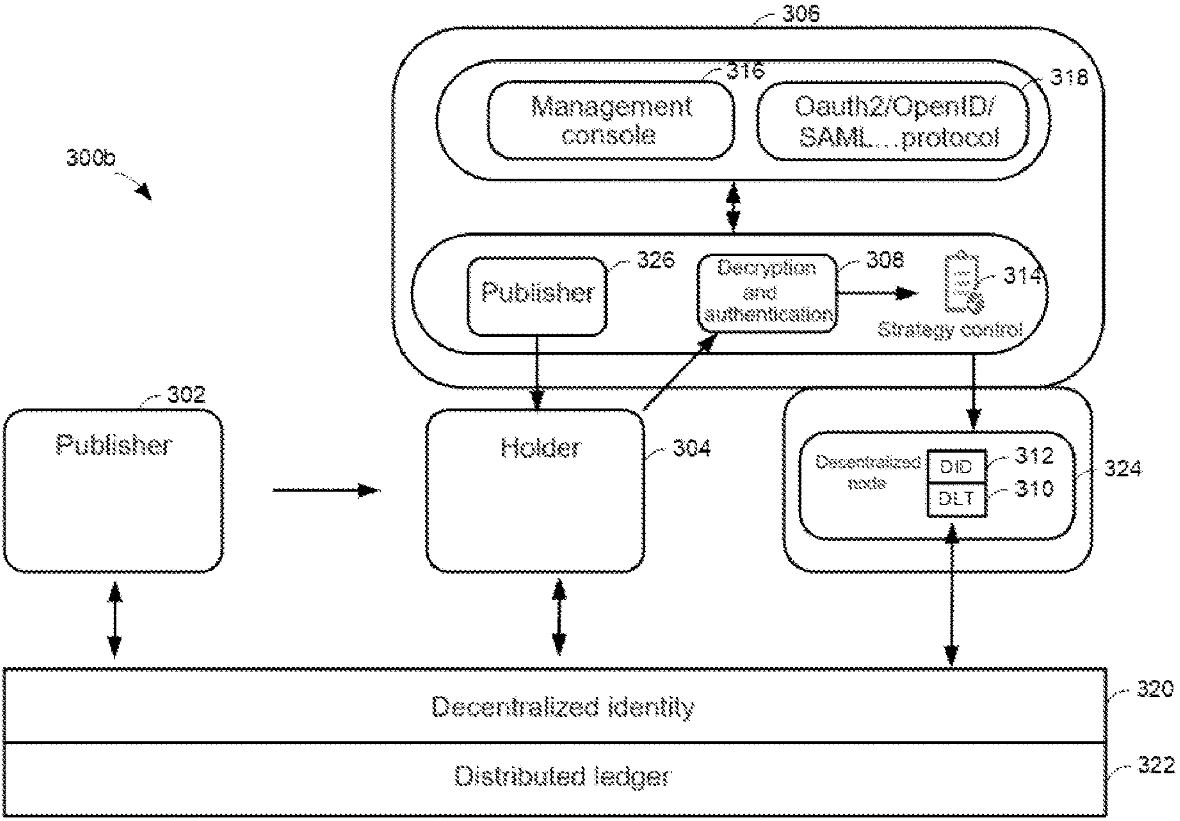
FIG. 3B illustrates a schematic diagram of another hybrid system based on SSI and IAM according to an embodiment of the present disclosure.

FIG. 3B illustrates a schematic diagram of another hybrid system 300*b* based on SSI and IAM according to an embodiment of the present disclosure. As shown in FIG. 3B, the hybrid system 300*b* based on the hybrid IAM architecture may include the authentication node 306, the decryption and authentication module 308, the management console 316, the strategy control module 314, and other elements or components illustrated in FIG. 3A. In some embodiments, the authentication node 306 in the hybrid system 300*b* can also serve as another SSI-based publisher 326 connected to the global decentralized identity.

The SSI-based publisher 326 can issue the signature, declaration, and other data related to the identity of the holder 304, such as a user, to the holder 304. These data such as signatures and/or declarations can then be used to be saved by the holder and issued to another authentication node or distributed ledger or blockchain network 322. In an embodiment, for example, when it is necessary to create a new user profile, such as an enterprise employee profile, the hybrid system 300*b* implemented according to the present disclosure can issue a declaration or identity signature for the employment information of the individual.

The declaration or identity signature may be held by the individual. The individual can make this declaration to another authentication node or another IAM when necessary. Similarly, the hybrid system 300*b* can make modifications by revoking and re-issuing a corresponding declaration to the individual. For example, when an employee retires, the hybrid system 300*b* can revoke the identity authentication or declaration of the employee. Additionally or alternatively, the hybrid system 300*b* may also modify the identity authentication status of the employee to retirement status and resend identity authentication or declaration to the employee. Thus, the present disclosure implements different operations from the general IAM system, because in the general IAM system, a new set of data about a newly created user will be generated in its database. In the hybrid system 300*b* based on the present disclosure, since all declarations or data are held by individuals, creating users in the hybrid system 300*b* based on the present disclosure means issuing new declarations to individuals.

Figure 4:
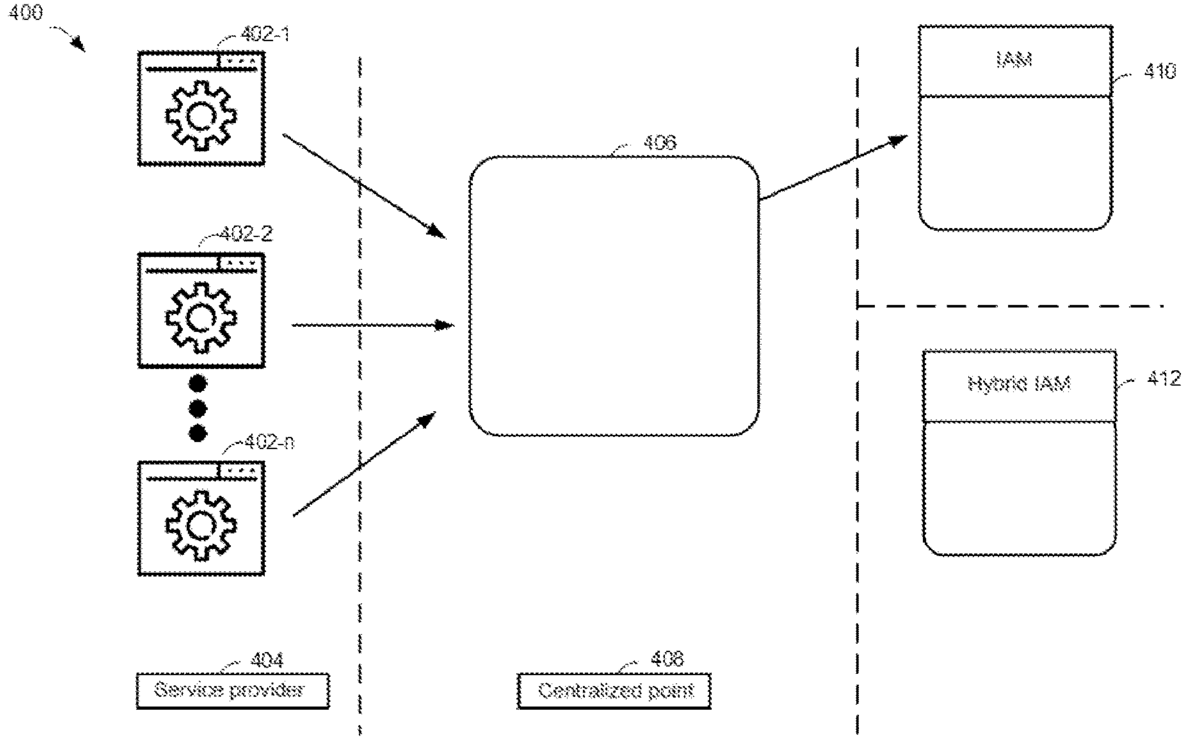
FIG. 4 illustrates a schematic diagram of an interaction process between a hybrid system and other systems according to an embodiment of the present disclosure.

FIG. 4 illustrates a schematic diagram of an interaction process 400 between a hybrid system and other systems according to an embodiment of the present disclosure. As shown in FIG. 4, in some embodiments, a plurality of applications 402-1, 402-2, . . . , 402-*n* from a service provider 404 may send encrypted data to an identity federator or federated identity authentication 406 in a centralized point 408. In some embodiments, the applications 402-1, 402-2, . . . , 402-*n* may be applications with different functions and transmitting via different protocols, such as social media applications, video applications, and the like. The centralized point 408 may be a centralized location, system, or entity for centralized management or processing of specific functions, data, processes, or the like.

In some embodiments, the identity federator 406 may be an identity authentication point where users only need to sign on and have their identities authenticated without the need to provide credentials in every application or system. The identity federator 406 can use standard identity authentication protocols, such as SAML, OAuth, or OpenID Connect, to communicate with various different applications and systems. The service provider 404 only needs to communicate with a single point, that is, the identity federator 406, and all necessary IAMs can be connected to the identity federator 406 and configured in the identity federator 406. In this mechanism, the service provider 404 can obtain the required user information and authorization through the unified interaction mechanism between the identity federator 406 and the industrial protocols.

In some embodiments, the identity federator 406 can communicate and interact with a generally centralized IAM 410 via a communication protocol such as SAML to transmit the encrypted data of the user. In some embodiments, the identity federator 406 can communicate and interact with a hybrid IAM 412 implemented based on the present disclosure via a communication protocol such as OpenID to transmit the encrypted data of the user.

According to the method implemented in the present disclosure, SSI may be included in the hybrid IAM 412, which may be a decentralized distributed IAM. The hybrid IAM 412 can handle the complexity of decentralization, so the user information and authentication obtained from SSI can be seamlessly integrated into the architecture. The service provider 404 can obtain DID information without processing different authentication logics and deploying decentralized nodes. In this architecture, the service provider 404 can easily support various sign-on mechanisms in conventional and decentralized IAMs, and customers can freely choose the sign-on mechanisms they often use and are familiar with, without confusing credentials in different platforms.

The method implemented by the present disclosure can realize the functional mapping between SSI and conventional IAM. It establishes a connection between general IAM and SSI, which makes it possible to realize all functions of IAM in a decentralized world. Identity authentication in the generally centralized IAM 410 can be mapped to the decryption and authentication by the authenticator in SSI. Authorization is to extract attributes and additional logic from the declaration after authentication. User modification is the issuance and revocation of the declaration in SSI.

The method implemented by the present disclosure can also realize a built-in decentralized node of the hybrid IAM 412. This makes the hybrid IAM 412 a part of a decentralized identity system and provides the hybrid IAM 412 with all the functions of SSI. A single hybrid IAM 412 acts as both a publisher and an authenticator in an SSI-based system. It can issue declarations, similar to creating users in the generally centralized IAM 410, and authenticate the declarations, which is the identity authentication and attribution extraction part in IAM. In some embodiments, a general protocol may be jointly provided for the hybrid IAM 412. The illustrative hybrid IAM 412 solution can support OpenID, SAML 2.0, and other identity protocols, which helps it be integrated by the federated identity provider.

Therefore, using methods of the type disclosed herein, the decentralized identity with more security and privacy protection can be easily and comprehensively adopted in the current centralized IAM ecosystem, without the need for developers of service providers to modify and integrate complexity, while providing users with seamless user experience.

Figure 5:
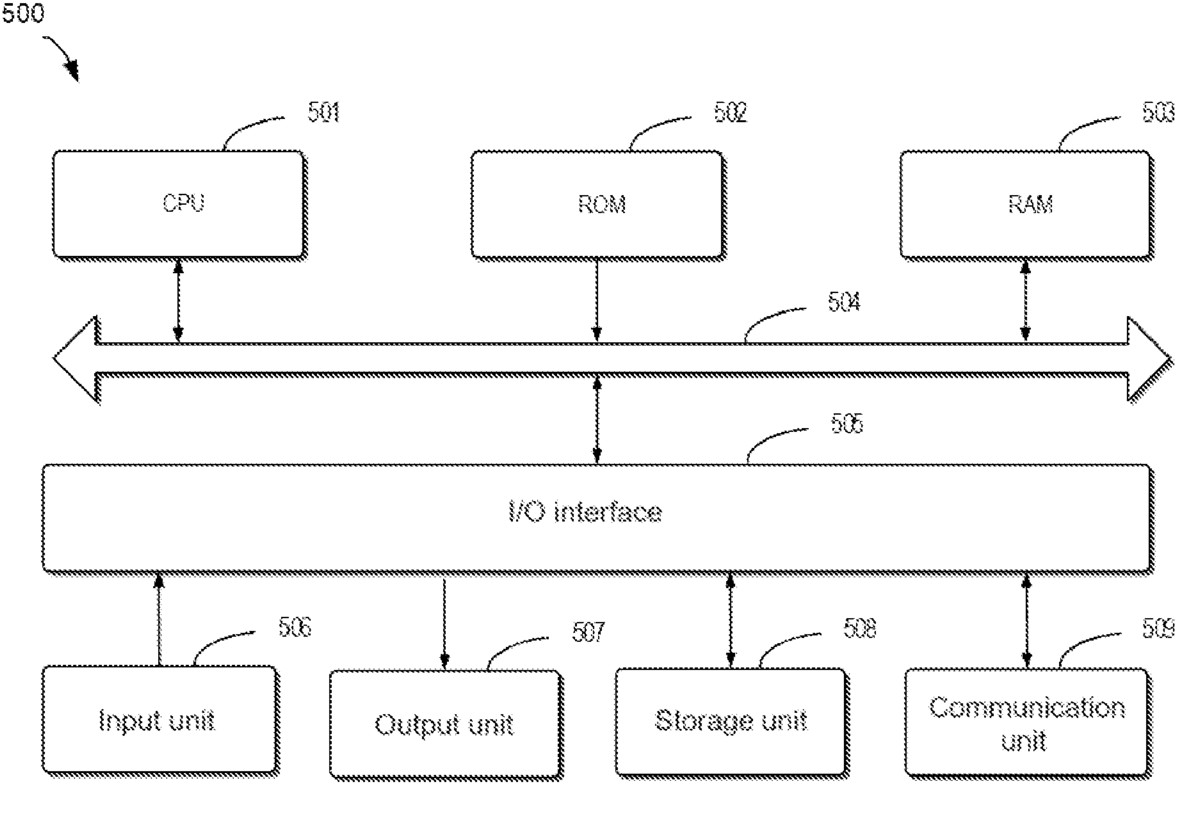
FIG. 5 illustrates a block diagram of an example device that can be used to implement embodiments of the present disclosure.

FIG. 5 is a block diagram of an example device 500 that can be used to implement embodiments of the present disclosure. A computing device in the system of FIG. 1A or the system of FIG. 1B, or in other systems herein, may be implemented using the device 500. As shown in the figure, the device 500 includes a central processing unit (CPU) 501, which may execute various appropriate actions and processing in accordance with computer program instructions stored in a read-only memory (ROM) 502 or computer program instructions loaded from a storage unit 508 onto a random access memory (RAM) 503. Various programs and data required for the operation of the device 500 may also be stored in the RAM 503. The CPU 501, the ROM 502, and the RAM 503 are connected to one another via a bus 504. An input/output (I/O) interface 505 is also connected to the bus 504.

A plurality of components in the device 500 are connected to the I/O interface 505, including: an input unit 506, such as a keyboard and a mouse; an output unit 507, such as various types of displays and speakers; the storage unit 508, such as a magnetic disk and an optical disc; and a communication unit 509, such as a network card, a modem, and a wireless communication transceiver. The communication unit 509 allows the device 500 to exchange information/data with other devices via a computer network, such as the Internet, and/or various telecommunication networks.

The various processes and processing described above, such as the method 200, may be performed by the CPU 501. For example, in some embodiments, the method 200 may be implemented as a computer software program that is tangibly contained in a machine-readable medium, such as the storage unit 508. In some embodiments, part of or all the computer program may be loaded and/or installed to the device 500 via the ROM 502 and/or the communication unit 509. When the computer program is loaded to the RAM 503 and executed by the CPU 501, one or more actions of the method 200 described above may be performed.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may maintain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, such as a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or the other programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that performs specified functions or actions, or using a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for identity authentication, comprising:

receiving, by an authentication node, encrypted data of a user in response to a determination by the user of a confidence of the authentication node indicating that the authentication node is a trusted node, wherein the authentication node is a node in a decentralized network and is connected with the Internet through a communication protocol to receive and authenticate encrypted data from the Internet, and the encrypted data includes personal information associated with user information, the encrypted data further comprising a signature issued by a publisher different than the user, the publisher being at least part of at least one node of the decentralized network;

decrypting, by the authentication node, the encrypted data; and determining, by the authentication node, an identity of the user based on authentication of the decrypted data;

wherein the encrypted data is encrypted with a private key provided by the publisher, the private key having a corresponding public key generated based on the private key, and the decentralized network generates a decentralized identifier associated with the user, the decentralized identifier uniquely identifying the user within the decentralized network, and stores the decentralized identifier and the public key in a decentralized identifier document on a blockchain implemented by the decentralized network, the decentralized identifier document comprising at least a first entry, the first entry including the public key and at least one of a key type indicator for the public key and a key purpose indicator for the public key, the authentication node retrieving the public key from the first entry of the decentralized identifier document for use in decrypting the encrypted data in accordance with the at least one of the key type indicator and the key purpose indicator.

2. The method according to claim 1, wherein decrypting the encrypted data comprises:

decrypting, by the authentication node, the encrypted data using the public key which is stored in the decentralized identifier document in the decentralized network.

3. The method according to claim 1, wherein authenticating the decrypted data comprises:

authenticating the data by determining a consistency of the signature in the data and the publisher signature in a publishing node.

4. The method according to claim 1, further comprising:

determining rights of the user based on strategy control in the authentication node and the encrypted data; and allowing the user to perform operations on the decentralized network based on the rights of the user.

5. The method according to claim 4, wherein allowing the user to perform the operations on the decentralized network comprises:

adding data to the decentralized network;

deleting data from the decentralized network; and modifying data in the decentralized network.

6. The method according to claim 1, further comprising:

issuing, by the authentication node, an identity signature to the user, wherein the identity signature is used for authentication with another authentication node.

7. The method according to claim 6, further comprising:

revoking or modifying, by the authentication node, the identity signature in response to invalidation of the identity signature.

8. The method according to claim 1, wherein the authentication node communicates with an identity federator to authenticate the identity of the user.

9. An electronic device, comprising:

at least one processor; and memory coupled to the at least one processor and having instructions stored therein which, when executed by the at least one processor, cause the electronic device to perform actions comprising:

receiving, by an authentication node, encrypted data of a user in response to a determination by the user of a confidence of the authentication node indicating that the authentication node is a trusted node, wherein the authentication node is a node in a decentralized network and is connected with the Internet through a communication protocol to receive and authenticate encrypted data from the Internet, and the encrypted data includes personal information associated with user information, the encrypted data further comprising a signature issued by a publisher different than the user, the publisher being at least part of at least one node of the decentralized network;

decrypting, by the authentication node, the encrypted data; and determining, by the authentication node, an identity of the user based on authentication of the decrypted data;

wherein the encrypted data is encrypted with a private key provided by the publisher, the private key having a corresponding public key generated based on the private key, and the decentralized network generates a decentralized identifier associated with the user, the decentralized identifier uniquely identifying the user within the decentralized network, and stores the decentralized identifier and the public key in a decentralized identifier document on a blockchain implemented by the decentralized network, the decentralized identifier document comprising at least a first entry, the first entry including the public key and at least one of a key type indicator for the public key and a key purpose indicator for the public key, the authentication node retrieving the public key from the first entry of the decentralized identifier document for use in decrypting the encrypted data in accordance with the at least one of the key type indicator and the key purpose indicator.

10. The electronic device according to claim 9, wherein decrypting the encrypted data comprises:

decrypting, by the authentication node, the encrypted data using the public key which is stored in the decentralized identifier document in the decentralized network.

11. The electronic device according to claim 9, wherein authenticating the decrypted data comprises:

authenticating the data by determining a consistency of the signature in the data and the publisher signature in a publishing node.

12. The electronic device according to claim 9, wherein the actions further comprise:

determining rights of the user based on strategy control in the authentication node and the encrypted data; and allowing the user to perform operations on the decentralized network based on the rights of the user.

13. The electronic device according to claim 12, wherein allowing the user to perform the operations on the decentralized network comprises:

adding data to the decentralized network;

deleting data from the decentralized network; and modifying data in the decentralized network.

14. The electronic device according to claim 9, wherein the actions further comprise:

issuing, by the authentication node, an identity signature to the user, wherein the identity signature is used for authentication with another authentication node.

15. The electronic device according to claim 14, wherein the actions further comprise:

revoking or modifying, by the authentication node, the identity signature in response to invalidation of the identity signature.

16. The electronic device according to claim 9, wherein the authentication node communicates with an identity federator to authenticate the identity of the user.

17. A computer program product comprising a non-transitory computer-readable storage medium having machine-executable instructions stored therein, wherein the machine-executable instructions, when executed by a machine, cause the machine to perform actions comprising:

receiving, by an authentication node, encrypted data of a user in response to a determination by the user of a confidence of the authentication node indicating that the authentication node is a trusted node, wherein the authentication node is a node in a decentralized network and is connected with the Internet through a communication protocol to receive and authenticate encrypted data from the Internet, and the encrypted data includes personal information associated with user information, the encrypted data further comprising a signature issued by a publisher different than the user, the publisher being at least part of at least one node of the decentralized network;

decrypting, by the authentication node, the encrypted data; and determining, by the authentication node, an identity of the user based on authentication of the decrypted data;

wherein the encrypted data is encrypted with a private key provided by the publisher, the private key having a corresponding public key generated based on the private key, and the decentralized network generates a decentralized identifier associated with the user, the decentralized identifier uniquely identifying the user within the decentralized network, and stores the decentralized identifier and the public key in a decentralized identifier document on a blockchain implemented by the decentralized network, the decentralized identifier document comprising at least a first entry, the first entry including the public key and at least one of a key type indicator for the public key and a key purpose indicator for the public key, the authentication node retrieving the public key from the first entry of the decentralized identifier document for use in decrypting the encrypted data in accordance with the at least one of the key type indicator and the key purpose indicator.

18. The computer program product according to claim 17, wherein decrypting the encrypted data comprises:

decrypting, by the authentication node, the encrypted data using the public key which is stored in the decentralized identifier document in the decentralized network.

19. The computer program product according to claim 17, wherein authenticating the decrypted data comprises:

authenticating the data by determining a consistency of the signature in the data and the publisher signature in a publishing node.

20. The computer program product according to claim 17, wherein the actions further comprise:

issuing, by the authentication node, an identity signature to the user, wherein the identity signature is used for authentication with another authentication node.

* * * * *